March 12, 1968 D. W. NICHOLAS ET AL 3,372,664
PROPULSION SYSTEM FOR A VEHICLE FOR TRAVELLING
OVER FLUID AND OTHER SURFACES
Filed May 31, 1966 5 Sheets-Sheet 1

INVENTORS
D. W. NICHOLAS
R. D. HUNT
E. G. TATTERSALL
BY
Cameron, Kerkam & Sutton
ATTORNEYS

March 12, 1968   D. W. NICHOLAS ETAL   3,372,664
PROPULSION SYSTEM FOR A VEHICLE FOR TRAVELLING
OVER FLUID AND OTHER SURFACES
Filed May 31, 1966   5 Sheets-Sheet 2

INVENTORS
D. W. NICHOLAS
R. D. HUNT
E. G. TATTERSALL
BY
Cameron, Kirkam & Sutton
ATTORNEYS

D. W. NICHOLAS ETAL  3,372,664
PROPULSION SYSTEM FOR A VEHICLE FOR TRAVELLING
OVER FLUID AND OTHER SURFACES

Filed May 31, 1966

INVENTORS
D. W. NICHOLAS
R. D. HUNT
E. G. TATTERSALL
BY Cameron, Kerkam & Sutton
ATTORNEYS

United States Patent Office 3,372,664
Patented Mar. 12, 1968

3,372,664
PROPULSION SYSTEM FOR A VEHICLE FOR TRAVELLING OVER FLUID AND OTHER SURFACES
David William Nicholas, Totton, Southampton, Rowland Delville Hunt, Hythe, and Edward Gunston Tattersall, Hythe, Southampton, England, assignors to Hovercraft Development Limited, London, England, a British company
Filed May 31, 1966, Ser. No. 554,144
Claims priority, application Great Britain, June 3, 1965, 23,826/65
15 Claims. (Cl. 114—67)

ABSTRACT OF THE DISCLOSURE

A propulsion system for propelling a vehicle, such as an air cushion vehicle, over water comprises a belt arranged in an endless loop and carrying a series of cleats adapted to thrust against the water. Each of the cleats incorporates a thrust surface which slopes outwardly from the loop in the direction of the leading edge of the cleat whereby, when the cleat enters the water, forces are produced which urge the cleat downwardly.

---

The present invention relates to a propulsion system for a vehicle for travelling over at least water surfaces.

Among known propulsion systems which have been used for propelling vehicles over water surfaces may be mentioned water-screw propellers which may or may not be disposed in a duct and paddle wheels.

Water-screw propellers are relatively efficient for low speed operation of vehicles, but at higher speeds, the efficiency falls quickly due to the high slip speed between the water and the propeller, which causes cavitation, and also due to the drag occasioned by the structures supporting the propeller. Furthermore non-ducted propellers have a tendency to impart a radially-outward motion to the surrounding water, particularly at the blade tips, so that some energy of the propeller which could otherwise be available to produce useful forward thrust is merely dissipated in flinging masses of water radially outwardly. This so-called "tip loss" can be reduced in some degree by disposing the propeller in a duct, but the improvement in efficiency is somewhat then offset by the drag of the duct.

Paddle wheels are not suited to high speed operation because between the moment of entering the water and the moment of leaving, the angle of attack of each blade relative to the water is constantly changing. Accordingly, each blade is deployed at the most efficient angle of attack for a very small portion of its path through the water and the overall efficiency of the paddle-wheel is low. Furthermore, the close proximity of the blades to each other, which is necessary to ensure that a sufficient number of blades is immersed simultaneously, causes each blade to move in the wake of the preceding blade and thus to perform relatively inefficiently. In addition, there is a considerable energy loss at the entry of each blade into the water due to splashing and a further energy loss occurs on leaving the water because the blades tend to lift water above the water surface. Paddle-wheels are generally heavy, and their maximum speed of operation is limited by their ability to withstand the consequently large centrifugal stresses therein.

The present invention seeks to provide an improved propulsion system, and according to the present invention there is provided a propulsion system for propelling a vehicle over water, the system comprising a flexible member arranged in an endless loop, a plurality of cleat elements carried by, and substantially uniformly spaced along, the flexible member, each cleat element being adapted to thrust against the water, there being support means disposed within the loop for supporting the flexible member with a bight of the loop freely dependent from the supporting means, and drive transmitting means for interconnecting a driving means to said flexible member for driving the flexible member and the said cleat elements around the loop.

In normal operation, only the freely-dependent bight of the loop of the flexible member will be immersed in the water, and there will be substantially no drag losses associated with parts which support and drive the flexible member.

Preferably, the form of each cleat element is such that, in operation, the thrust of the cleat element against the water produces hydrodynamic forces which urge the cleat element downwardly in the water, and thus maintains the free-dependent bight immersed in the water. To this end, each cleat element may have forward-thrust surfaces which diverge away from the leading edge thereof and which also diverge outwardly from the loop of the flexible member. In order to ensure that the freely-dependent bight is also immersed when the propulsion system is operated in reverse, each cleat element may also have reverse-thrust surfaces which diverge away from the trailing edge of the element and which diverge outwardly from the loop. The thrust surfaces of each cleat element may be provided by parts which define a space outwardly of the loop, there being a cap portion providing the outermost boundary of the space. Thus in the case of a cleat element without reverse-thrust surfaces of the form described, the cap portion imparts a bucket-like form to the cleat element, the open mouth of the bucket facing in the direction of reverse thrust so that the cleat element can be utilised fairly efficiently to produce reverse thrust. In the case of the cleat element having reverse-thrust surfaces, the cap portion serves to prevent the formation of energy-dissipating eddies in the space between the parts on which the thrust surfaces are provided.

In another form, each cleat element may have a forward-thrust surface which diverges outwardly from the loop in the direction of the leading edge of the element. Each cleat element may comprise two spaced-apart portions which extend outwardly from the loop and define with the forward thrust surface a space which is wider towards the leading edge of the element than towards the trailing edge.

In a further form, each cleat element may have the general form of a hollow frusto-cone, the leading edge of the element being at the wider end thereof.

It is preferable that water can drain out of the space within the cleat element so that a minimum of work is done on lifting water when the cleat element leaves the water. To this end, each cleat element may have water-drainage apertures.

The support means for the flexible member may comprise a roller which drivably engages the flexible member.

The flexible member may be drivably received between the said roller and a pinch roller disposed outside the loop, and the drive transmitting means may comprise an axle upon which one of the rollers is drivably mounted, the axle being arranged for connection to the driving means.

The roller may be provided with sprockets which drivably engage with the peripheries of a series of apertures formed in the flexible member. In this construction, there is a risk that at high rotational speeds of the roller, the flexible member might be flung off the roller. Accordingly, the flexible member may pass between a guard member disposed outside the loop and the roller, the guard member partly surrounding the roller and serving to maintain the flexible member and the roller in driving engagement. Alternatively, or additionally, the flexible member may be maintained in driving engagement with the roller by means of a resiliently mounted jockey wheel.

According to another construction, the roller may have a peripheral groove and, in operation, a partial vacuum may be applied to the groove over a region which is fixed relative to the axis of rotation of the roller, whereby the flexible member is maintained in driving engagement with the roller, in the said region of the groove. The roller may be mounted on a hollow axle which is adapted for connection to a vacuum producing means, the interior of the axle communicating, through the roller, with the peripheral groove and there may be an obturating means which is fixed in relation to the axis of rotation of the roller and which, in operation, confines the partial vacuum substantially to the said region of the groove.

The support means may comprise another rotatable roller which is disposed within the loop and spaced apart from the first-mentioned roller.

The propulsion system may also comprise means which are operable to urge the freely-dependent bight of the flexible member downwardly, whereby the flexible member and the cleat elements can be maintained in co-operation with a land surface for providing propulsion over land. In addition, or alternatively, there may be one or more rotatable wheels which are retractably mounted for engagement and disengagement with said drive transmitting means, whereby, when the wheels are engaged with the drive-transmitting means, they can be used for propelling and/or steering the vehicle over land surfaces.

During operation of the vehicle over land, it may be desirable to prevent the freely-dependent bight of the loop of the flexible member from trailing on the ground; to this end, there may be provided means which are operable to raise the freely-dependent bight relative to the drive transmitting means, until it is clear of the ground.

It has been mentioned above in connection with paddle-wheels that it is detrimental to propulsion efficiency to have a cleat element following in the wake of a preceding cleat element. Accordingly, the propulsion system according to the invention may be combined with another like propulsion system, the planes in which the looped flexible members move converging in the direction of forward thrust. The angle of convergence of the planes of movement of the flexible members may be up to 20°. Both propulsion systems will produce thrusts in the forward direction, which are additive, and equal and opposite side thrusts, which cancel each other out. The energy dissipated in the production of the side thrusts is, however, compensated by the increased propulsive efficiency resulting from the fact that in each propulsive system, a cleat element does not follow wholly in the wake of the preceding cleat element.

The present invention further provides a vehicle incorporating a propulsion system as described above, and the vehicle may be a gas cushion vehicle comprising a body and means for laterally containing at least one cushion of pressurised gas beneath the body.

Since the main advantages of gas cushion vehicles spring from the fact that in normal operation there is little, if any, intentional contact with the surface over which the vehicle is to travel, the referred-to known propulsion systems, which cannot avoid such contact, detract from the potential performance of the vehicles of this type. However, where a gas cushion vehicle incorporates a propulsion system in accordance with the invention the contact of the vehicle with the surface will be confined substantially to the freely-dependent bight of the flexible member and therefore only useful to the propulsion of the vehicle.

It has been found that the propulsion system in accordance with the invention is capable of propelling a vehicle relative to a water surface beneath the vehicle at comparatively high speeds and with acceptable efficiency. This is mainly because the freely-dependent bight of the flexible member can provide engagement with the water over a distance which is only limited by the overall length of the flexible member which is available. This is in contrast to a paddle wheel where the size and inertia of the paddle wheel become unmanageable and uneconomic in relation to the power available from the driving motor. Because the water engaging length of the flexible member can be relatively large, the losses associated with the entry and exit of the cleat elements from the water become comparatively small. This, too, is in contrast to a paddle wheel in which the entry and exit losses are significantly large because of the relatively small length of the useful water engaging section of the paddle wheel.

It is estimated that so far as the geometry of the flexible member and the cleat elements is concerned, the most efficient operation is secured generally when the cleat elements are spaced apart about eight to ten times the height which they stand out from the flexible member. For practical purposes, however, such a relatively large spacing would prove limitative to the power which could be utilised by the propulsion system since the number of cleat elements in the water at any instant would be small, and it is preferred that the spacing of the elements should be about five times their height from the flexible member.

Embodiments of the invention, given by way of non-limitative example only, will now be described with reference to the accompanying drawings in which.

In the drawings, wherever a particular part appears in more than one figure, it will be designated by the same reference numeral.

Figure 1:
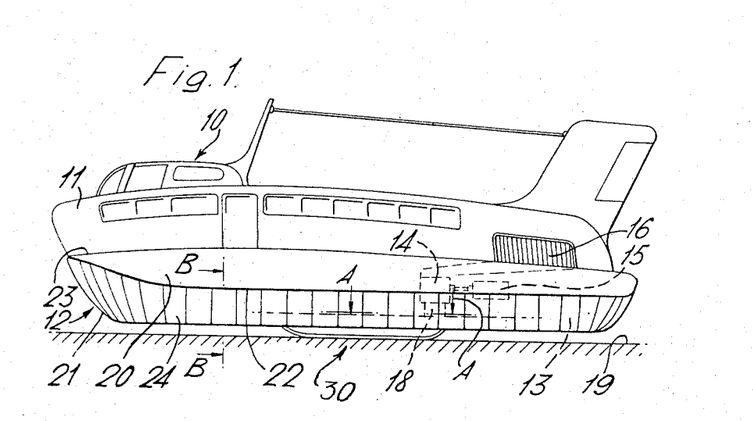
FIGURE 1 is a side elevation of a gas cushion vehicle in accordance with the invention.

Referring first to the accompanying drawings: in FIGURE 1, there is shown a vehicle 10 having a body 11 and a wall or skirt 12 downwardly depending from the periphery of the bottom of the body 11 so as to form a lateral boundary of a space 13 beneath the body. Disposed within the body 11 is a fan 14 which is drivably connected to a motor 15. When the motor 15 is operated, the fan 14 induces air from an intake 16 on the outside of the body 11 and pressurises it. The pressurised air from fan 14 is discharged to the space 13 through one or more ducts 18 (only one being shown in FIGURE 1) which terminate in ports (not shown) in the bottom of the body 11. The pressurised air in space 13 forms a cushion which exerts a lifting force on body 11 and supports the vehicle 10 out of contact with the surface 19 beneath the vehicle 10. In operation, the vehicle 10 is raised from surface 19 and pressurised air in space 13 continuously escapes between the wall 12 and the surface 19 and is continuously replenished by the fan 14. Since most or all of the weight of the vehicle 10 is supported by the cushion of pressurised air in space 13 and the vehicle is substantially clear of the surface 19, there is little or no frictional drag with the surface 19 and the vehicle can be relatively easily propelled over the surface 19. For operation over water, the vehicle 10 may be wholly raised above surface 19, or only the body 11, since the drag of the wall 12 in the water may be quite small and acceptable in view of the advantage then derived in respect of the containment of the air in the cushion space 13.

Figure 2:
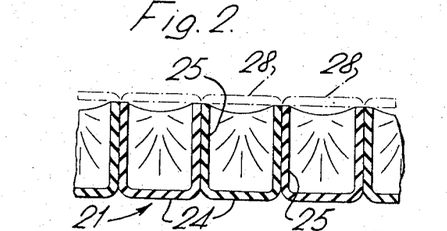
FIGURE 2 is a horizontal sectional view of the vehicle of FIGURE 1 taken on line A—A.
Figure 3:
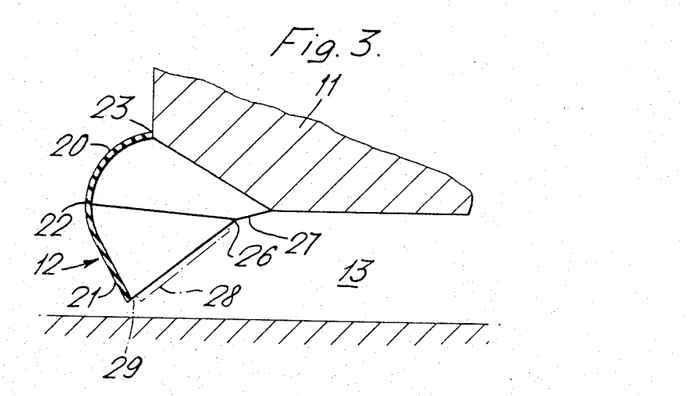
FIGURE 3 is a vertical sectional view of the vehicle of FIGURE 1 taken on line B—B.

Referring now also to FIGURES 2 and 3, it will be seen that the skirt 12 comprises an upper wall 20 which is attached to the vehicle body 11 at the sides and rear of the body 11, and a lower wall 21 which is attached directly to the body 11 at the front of the vehicle 10 and to the lower margin 22 of the upper wall 20 at the sides and rear of the vehicle 10. The upper wall 20 is formed from one or more panels of flexible sheet material such as rubber or rubberised fabric and depends by its upper margin 23 from the vehicle body 11. The lower wall 21 is formed from a succession of wall members 24 arranged side-by-side. Each wall member 24 comprises a substantially right-triangular piece of flexible sheet material which has been folded to an arch-shaped and disposed in the lower wall 21 with the limbs 25 of the arch inwardly disposed of the closed end thereof. The upper margin of the closed end of the arch is attached to the lower margin 22 of the upper wall 20, and the innermost upper extremity 26 of each limb 25 is connected to the vehicle body 11 by a tie cord 27, as will be seen from FIGURE 3.

During operation, the pressurised air cushion in the space 13 beneath the body 11 inflates the upper wall 20 and the lower wall 21 to the illustrated shapes. In particular, the adjacent limbs 25 of neighbouring wall members 24 are urged by the pressurised air into sealing co-operation with each other so that substantially no air can escape between them.

It will be appreciated that at the rear of the vehicle 10, the wall members 24 will tend to scoop water upwards whenever they contact the water. This is undesirable because of the large amount of drag thus occasioned and the risk of damage to the wall members 24. Accordingly, a membrane 28 (shown dotted in FIGURES 2 and 3) is attached (e.g., by glueing, rivetting or lacing) to the inner margins of the limbs 25. A small gap 29 is left between the bottom of the membrane 28 and the wall member 24 to permit drainage of water and/or debris.

Because the wall or skirt 12 is of flexible material, the vehicle 10 is able to negotiate obstacles which project into the path of the skirt 12. The skirt 12 deflects over such obstacles without substantially suffering damage and without the passage of the vehicle 10 being impeded.

For the purpose of explaining the invention, it will now be assumed that the surface 19 is a water surface.

Figure 4:
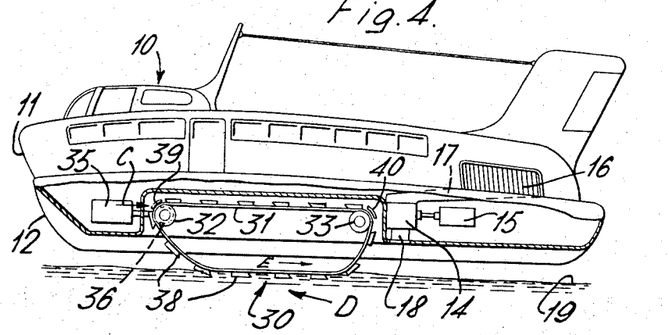
FIGURE 4 shows a partially broken away side view of the gas cushion vehicle of FIGURE 1, showing the propulsion system in accordance with the invention.

Referring now to FIGURE 4, the gas cushion vehicle 10 incorporates a propulsion system, generally designated 30, in accordance with the invention. As shown in the elevation of FIGURE 1, only one such system 30 can be seen, but it is to be understood that more than one propulsion system in accordance with the invention may be incorporated in the vehicle 10 to suit the contemplated duties of the vehicle 10.

The propulsion system 30 comprises a flexible member 31 which is arranged in an endless loop around two spaced-apart rollers 32, 33, the axes of which are preferably horizontal or nearly horizontal so that the flexible member 31 is disposed in a vertical or nearly vertical plane. The roller 33 is freely mounted for rotation on bearings (not visible in FIGURE 4) and the roller 32 is suitably mounted for rotation on a power transmitting axle (not visible in FIGURE 4) and is coupled to a motor 35 through a combined clutch and right angle drive gearbox unit 36.

The flexible member 31 and the rollers 32, 33 are adapted so that when motor 35 is operated and power is transmitted to roller 32, the flexible member 31 is engaged by the roller 32, and driven in the direction indicated by arrow E. The lowest bight of the loop of the flexible member 31 is arranged to be freely dependent below the rollers 32, 33 and below the body 11. The flexible member 31 carries a number of cleat elements 38 which are upstanding outwardly of the loop of the flexible member 31, and are adapted to thrust against the water as the freely dependent bight of the flexible member 31 is driven relative to the water. The cleat elements 38 are so formed, as will be described below, that when they thrust against the water, hydrodynamic forces are generated which tend to urge the elements 38 downwardly into the water. Thus, the flexible member 31 will be in tension just prior to its engagement with roller 32, due to the rotation of roller 32, and will be in tension following roller 32 due to the forces downwardly acting on the cleat elements 38. The geometric form of the loop of the flexible member 31 will therefore be relatively stable.

Figures 5, 6:
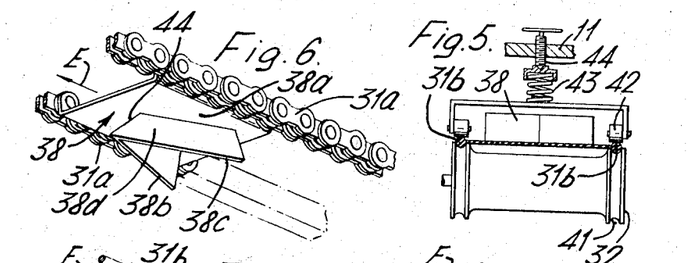
FIGURE 5 is a view looking in the direction of the arrow C of FIGURE 4, and showing an alternative drive arrangement.
FIGURE 6 is an enlarged perspective view from underneath the vehicle in the direction of arrow D in FIGURE 4, and showing a cleat element.

Referring now to FIGURE 6, it will be seen that the flexible member 31 is formed from two parallel linked chains 31a. The rollers 32 and 33 are provided with sprockets (not visible in FIGURE 4) which co-operate with the links of the chains 31a, and in the case of the roller 32, the sprockets provide the driving connection with the flexible member 31. At high rotational speeds of the rollers 32, 33, there is a risk that the chains 31a might become disengaged from the sprockets of the rollers 32, 33. To avoid this possibility, guard members 39, 40 are provided (see FIGURE 4) which partially surround the corresponding rollers 32, 33 with the flexible member 31 in between. Alternatively, or additionally, the flexible member 31 can be maintained in driving engagement with the rollers 32, 33 by means of resiliently mounted jockey wheels (not shown).

An alternative means of driving the flexible member 31 is depicted in FIGURE 5 wherein the flexible member 31 comprises two thin parallel cables 31b each of which is received in a peripheral groove 41 of the roller 32 and pressed into driving engagement with the roller 32 by a pinch roller 42. Each cable 31b has a multi-strand wire core sheathed in a flexible material such as rubber or polyethylene so that the rollers 32, 42 will grip the cable 31b without slipping under load. The pinch roller 42 is urged towards the roller 32 by a compression spring 43 and the compression force can be varied, e.g., for removing the pinch roller 42, by means of the screw jack unit 44.

Referring again to FIGURE 6, it will be seen that the linked chains 31a constituting the flexible member 31 carry a number of cleat elements 38 at substantially uniform intervals. Each cleat element 38 is formed from flexible material such as the rubber-canvas composition used in tyre outer casings, and comprises a base portion 38a which is substantially flat during operation and extends partly along the length of the flexible member 31, and a thrust portion 38b having forward-thrust surfaces 38c provided by the rearwardly divergent parts 38d. The base portion 38a is attached to the chains 31a in any suitable manner; for example, each chain 31a may comprise a number of hook-like portions (not shown) which engage with eyes (not shown) on the longitudinal edges of the base portion 38a so that replacement of the base portion 38a is relatively easily effected.

The thrust portion 38b is attached to the base portion 38a (e.g., by heat-bonding) so that the apex 44 of the V formed by the divergent parts 38d is disposed outwardly of the loop of the flexible member 31 and forms the leading edge of the thrust portion 38b. The divergent parts 38d of the V-shaped thrust portion 38b also diverge away from each other outwardly of the flexible member 31 so that the cleat element 38 resembles a ploughshare which, when moved in the direction of arrows E relative to the water, tends to be downwardly urged in the water and thus maintains the tension in flexible member 31. Because of the ploughshare form, the cleat elements 38 tend to raise very little water upwards from the surface 19 when they leave the water, and hence energy losses in this respect are small. For the same reason, energy losses at the entrance of the elements 38 to the water is small.

This type of element 38 can be operated in a direction opposite to that of arrows E, e.g., for manoeuvring or travelling in reverse at low speeds, but does not then provide as much thrust.

Figures 7, 9:
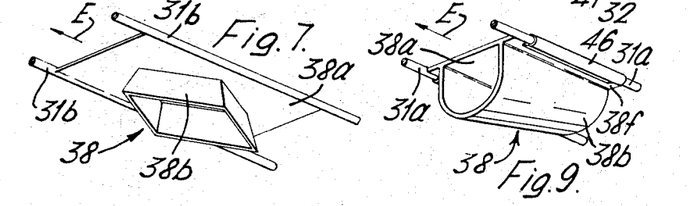
FIGURE 7 shows, in a view corresponding to that of FIGURE 6, a modified form of the cleat element of FIGURE 6.
FIGURE 9 is a view similar to that of FIGURE 6 but of another form of cleat element.

FIGURE 7 illustrates a modification of the cleat element 38 of FIGURE 6, which can be operated to provide a reversed propulsive thrust substantially equal to the forward propulsive thrust. This modified cleat element 38 comprises, in effect, two of the elements 38 of FIGURE 6 arranged back-to-back so that in plain view, the upstanding thrust portion 38b forms a diamond shape, attached on the substantially flat base portion 38a. The parts 38d of the thrust portion 38b all diverge away from each other outwardly of the flexible member 31. In this instance, the flexible member 31 is in the form of two parallel cables 31b, each having a multistrand wire core sheathed in polyethylene or rubber. Each cleat element 38 is bonded to the sheathing of the cables 31b by the action of heat. The flexible member 31 would be driven in the manner described in relation to FIGURE 5.

Figure 8:
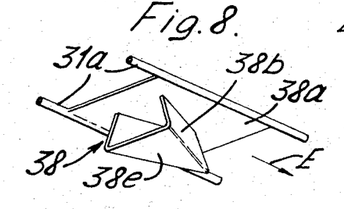
FIGURE 8 shows another modification of the cleat element of FIGURE 6.

FIGURE 8 illustrates another modification of the cleat element 38 of FIGURE 6, which can be operated in reverse to give a performance which is comparable with its performance in the forward direction of the arrows E. This embodiment basically comprises the element 38 of FIGURE 6, with a substantially flat cap part 38e attached between the outermost free edges of the limbs and apex of the thrust portion 38b to define with the base portion 38a and the thrust portion 38b a bucket-type vane which can thrust against the water when the flexible member 31 is operated in reverse.

FIGURE 9 shows another form of cleat element 38 having the general form of a hollow frusto-cone somewhat like a sea anchor or a wind sock and arranged so that the wider end thereof is the leading end. The cleat element 38 is disposed between two thin cables 31a constituting the flexible member 31 and provided with attachment portions 38f which are connected to the cables 31a by short lengths 46 of metal sheet which is crimped around the cables and inturned into the attachment portions 38f.

Figure 10:
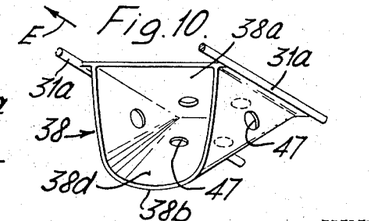
FIGURE 10 is a perspective view of yet another form of cleat element.

FIGURE 10 shows a cleat element 38 which is shaped somewhat like a scoop or bucket. This element 38 comprises a base portion 38a attached to the two cables 31a and which is normally slightly curved outwardly of the plane of the cables 31a so that it can pass around the rollers 32, 33, and a thrust portion 38b which is attached to the base portion 38a and forms therewith a scoop having a forward thrust surface 38d which diverges outwardly towards the leading edge away from the flexible member 31. The thrust portion 38b has apertures 47 therein to allow for the rapid drainage of water as the element 38 leaves the water surface. It will be appreciated that the divergence of the thrust surface 38d of the thrust portion 38b from the flexible member 31 toward the leading edge of the element 38 produces forces, during operation, which urge the element 38 downwardly in the water as it is moved relative to the water.

Figure 11:
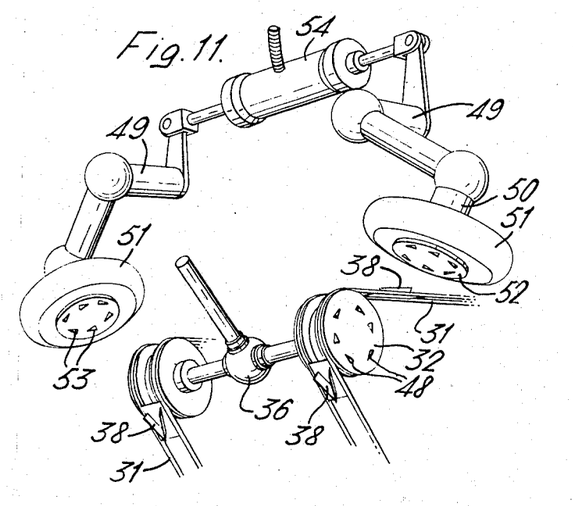
FIGURE 11 is a perspective view of part of a modified version of a propulsion system according to the invention.

Referring now to FIGURE 11, there will be seen a pair of rollers 32 around each of which passes a flexible member 31 carrying a plurality of cleat elements 38. In FIGURE 11 the cleat elements 38 are of the type shown in FIGURE 6. Each roller 32 is adapted in a manner hereinafter to be described for driving the flexible member 31, and is itself driven via the gearbox 36. On the outer face of the rollers 32 are dog-teeth 48. Pivotally attached to the body of the vehicle 10 above the rollers 32 are a pair of arms 49 which can each be swung about a horizontal axis parallel to the longitudinal axis of the vehicle 10 by means of a hydraulic ram 54. The arms 49 have stub axles 50 at their extremities, the stub axles 50 being at about right angles to main axis of the arms 49 and rotatably supporting road wheels 51. Each road wheel 51 comprises a plate 52 having dog-teeth 53, and when the arms 49 have been fully swung downwards, the dogs 48 of the rollers 32 engage the dog-teeth 53 as the rollers 32 are rotated in the forward direction so that the road wheels 51 can be driven from gearbox 36. The road wheels 51 are provided mainly to enable the vehicle 10 to be steered over land, and it is not intended that they should support the whole weight of the vehicle 10 during normal operation of the vehicle 10 over land. When the arms 49 are fully raised, only the freely-dependent lowest part of the loop of the flexible member 31 projects below the skirt 12.

It is also contemplated (although not shown) that power can be transmitted to the road wheels 51 alone for operation over land without driving the flexible member 31 by means of a suitable clutch arrangement. The power drive to wheels 51 enables the vehicle 10 to operate over land without a cushion of pressurised gas beneath the body 11, but as stated above, the intended purpose is that when a cushion is formed beneath the vehicle 10, the vehicle 10 can be steered along a desired course relative to the ground in circumstances where this would otherwise be difficult, for example in a high wind. It is also envisaged, although not illustrated, that the wheels 51 can be retractably mounted on body 11 in the maner of an aircraft undercarriage. An aircraft-type retractable mounting for wheels 51 would differ somewhat from the illustrated arrangement, but is constructional details are well known to those skilled in the art.

Just as it might be desirable to retract the road wheels 51 for operation over water, so it might be desirable to arrange that the flexible member 31 can be raised so that it is clear of the surface when the vehicle 10 is to operate over land to avoid water or damage to the cleat elements 38.

Figure 12:
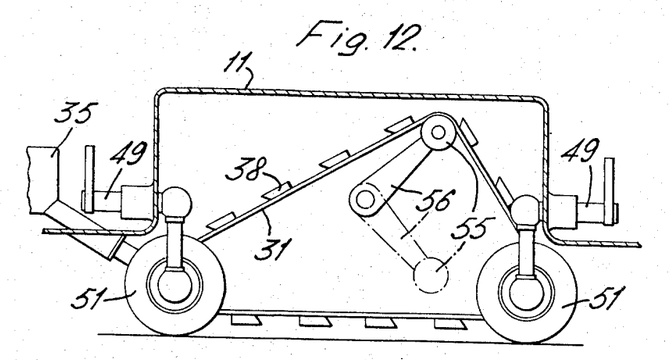
FIGURE 12 shows schematically the propulsion system of FIGURE 11 when adapted for use over land surfaces.

FIGURE 12 shows one manner of raising the flexible member 31 to avoid from ground contact. A roller 55 is mounted on a vertically movable arm 56 within the loop of the flexible member 31. For operation over water, the arm is adjusted by means of a hydraulic jack (not shown) so that roller 55 is in the chain-lined position. When it is desired to raise the flexible member 31 as aforesaid, the arm is repositioned until roller 55 is in the solid-line position.

FIGURES 13 to 16 show another arrangement for driving flexible member 31, in which the roller 32 is mounted on a hollow axle 60 which is attached to a source of vacuum (not shown), the bore 61 of the axle 60 communicating via hollow spokes 62 with peripheral grooves 63 formed in the rim of the roller 32. As will be seen from FIGURES 14, 15 and 16, the grooves 63 have a narrow parallel walled portion 64 disposed radially inwardly of a wider portion, the sides of the wider portion being shaped to co-operate with the flexible member 31.

Figures 13, 14, 15, 16:
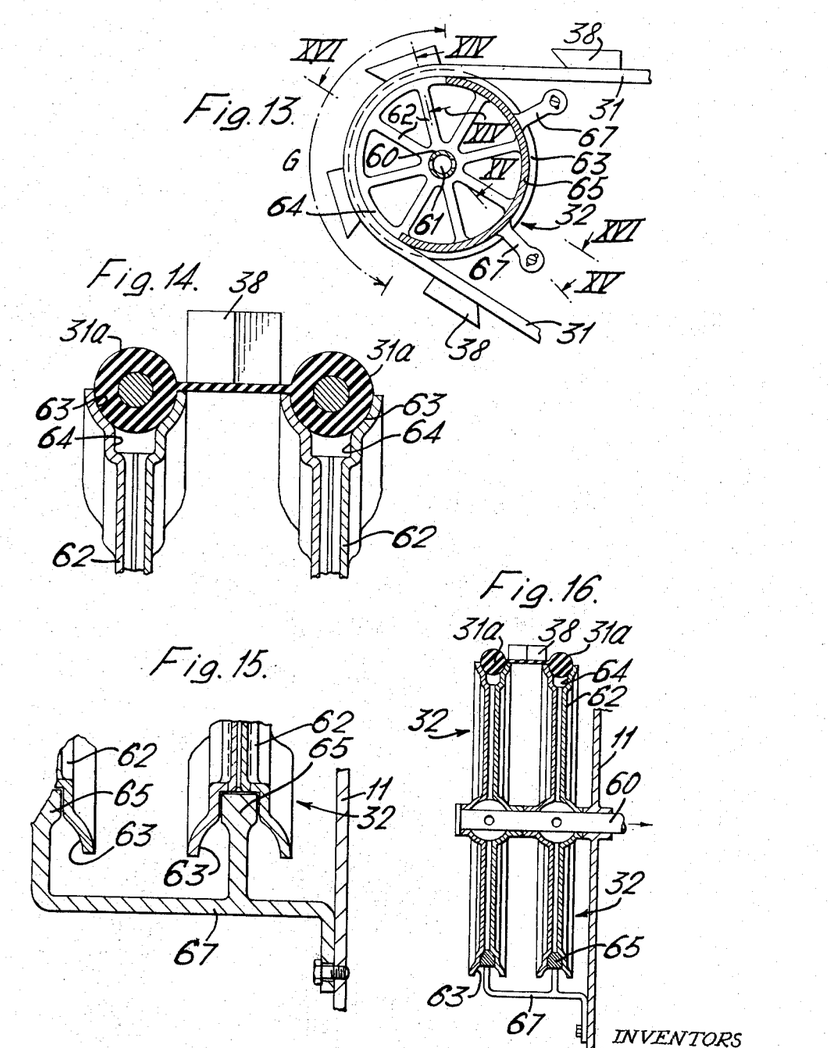
FIGURE 13 shows one arrangement for driving the flexible member of a propulsion system according to the invention.
FIGURE 14 is a cross-sectional view of the line XIV—XIV of FIGURE 13.
FIGURE 15 is a cross-sectional view on the line XV—XV of FIGURE 13.
FIGURE 16 is a cross-sectional view on the line XVI—XVI of FIGURE 13.

Within the narrow portion 64 of each groove 63 is an obturating member 65 which serves to confine the partial vacuum produced by the source of vacuum substantially to the region of the roller 32 on which it is desired that the flexible member 31 is to be in driving contact. In effect the obturating member 65 blocks the radially outer ends of the hollow spokes which, at the time being, are disposed radially inwardly thereof. The obturating member 65 is held stationary relative to the axis of roller 32 by a series of suitable linking parts 67 (only one of which is shown in FIGURE 15) attached to the body 11 of the vehicle. The obturating member 65 is formed from a low friction material, such as polytetrafluoroethylene, and the region of the groove 63 to which it confines the full depression of the applied vacuum is indicated by G in FIGURE 13. During operation of this arrangement, therefore, the flexible member 31 is held in driving engagement with the roller 32 by the vacuum over section G of the roller 32. The flexible member 31 is advantageously in the form of two parallel rubber-coated cables 31a (see FIGURES 14 and 16), corresponding with the cables 31a of, for example, FIGURE 9. The rubber coating enhances the sealing of each cable 31a to the rim of roller 32 over section G thereof. During operation over water, the cables would additionally be wetted by the water so that the sealing would be still further enhanced. For operation over land, the cables could be wetted by water spray devices (not shown) carried on the vehicle 10.

Figures 17, 18, 19:
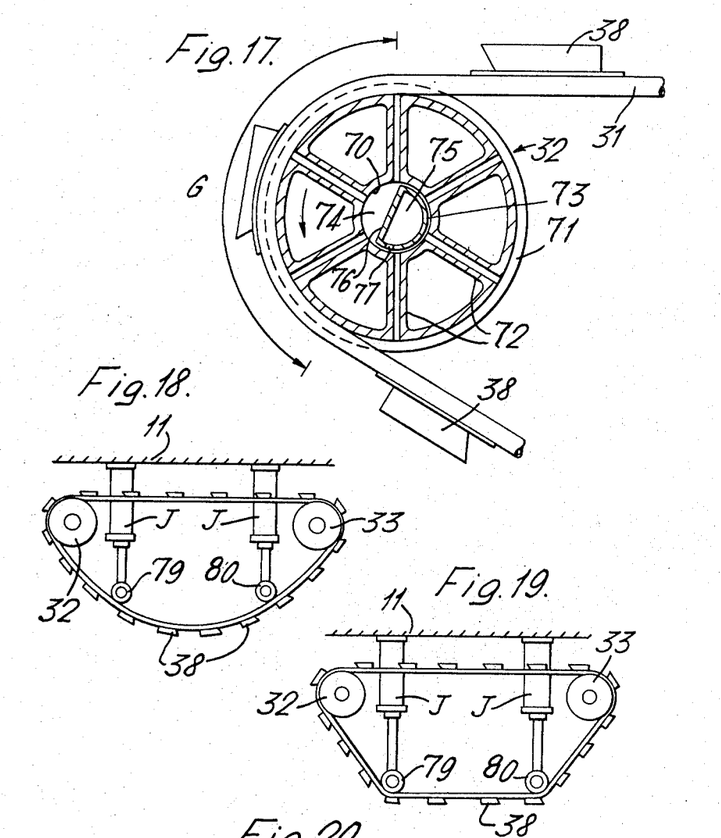
FIGURE 17 shows another driving arrangement.
FIGURE 18 shows a modified form of the propulsion system of FIGURE 1.
FIGURE 19 shows the propulsion system of FIGURE 18 as adapted for use over land.

FIGURE 17 shows another arrangement for driving flexible member 31. In this arrangement, the roller 32 has a hollow hub 70 which communicates with a peripheral groove 71 via hollow spokes 72, the peripheral groove 71 being adapted to receive cables 31a, constituting the flexible member 31.

Within the hollow hub 70 is an obturating valve member 73 which is held stationary relative to the axis of rotation of the roller 32 and which divides the interior of the hub 70 into a first space 74 and a second space 75 by means of a partition 76 which extends through the hollow axle (not shown) of the roller 32, extending perpendicularly out of the plane of the drawing. The space 74 communicates with the region G of the rim of the roller 32 over which the flexible member 31 is to be drivably engaged, via the hollow spokes 72, and a vacuum is applied to part G of the rim via the space 74 and the corresponding part of the hollow axle of the roller 32. The space 75 communicates with the remaining part of the rim of roller 32 via a port 77 in valve member 73 when a hollow spoke 72 is in register therewith. If desired a positive pressure of air may be applied via another part of the hollow axle corresponding to the space 75 within the valve member 73 to the remaining part of the rim through the port 77 and one of the spokes 72 in order to accelerate the disengagement of the flexible member 31 from the rim of the roller 32.

Thus, during operation, the flexible member 31 is sucked into driving engagement with the roller 32 by the vacuum from space 74, acting over section G of the rim of the roller 32, and may be "blown" off roller 32, if desired, by the positive pressure of air applied just after the flexible member 31 has passed section G.

FIGURE 18 shows a modification of the propulsion system 30 of FIGURE 4. It will be seen that the modified system differs from the system of FIGURE 4 in the provision of rollers 79, 80 which are downwardly held in contact with the flexible member 31 by means of respective hydraulic jacks J, disposed between the rollers 79, 80 and the body 11 of the vehicle 10.

For operation over water, the Jacks J are not fully extended, so that the lowest bight of the loop of flexible member 31 is freely dependent below rollers 79, 80 in accordance with the invention, and the operation of the system is substantially identical with the operation of the system 20 shown in FIGURE 4. For operation over land, the jacks J are extended as shown in FIGURE 19 so that the flexible member 31 is in tension between rollers 79, 80. The vehicle 10 having this system can now operate over land in the same manner as would be conventional tracked vehicle, and the provision of the road wheels 51 and the retracking and lowering mechanism of FIGURES 11 and 12 now become unnecessary (although they may still be retained if desired).

Figure 20:
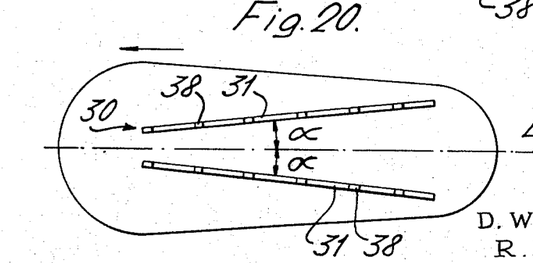
FIGURE 20 is a schematic underneath plan view of a vehicle incorporating two propulsion systems in accordance with the invention.

FIGURE 20 shows a schematic underneath plan view of a vehicle 10 incorporating the propulsion system 30 in accordance with the invention. It will be seen that the loops of the flexible members 31 define vertical planes inclined at an angle α to the longitudinal axis of the vehicle 10 and symmetrically on each side of the longitudinal axis L of the vehicle 10. Each cleat element 38 thus does not move through the whole wake of the preceding element 38 and is correspondingly the more efficient. The angle α may be of a magnitude up to about 20°, although 15° seems to be about the most effective order of magnitude for the types of cleat elements 38 described previously. The elements 38 may be arranged so that they point generally in the intended direction of motion of the vehicle 10 rather than along the line of motion of the respective flexible member 21.

The invention is not limited to the illustrated and described embodiments. For example, it is contemplated that the roller 33, i.e., in FIGURE 4, could be replaced by a circular-sectioned bar of low-friction material which is non-rotatably mounted on the vehicle body 11 so that the flexible member 31 slips around it during operation.

In an alternative arrangement the rollers 32 and 33 are replaced by air bearings in which means are provided within the loop of the flexible member for forming a film of air (or other suitable gas) under the flexible member 31. The flexible member 31 is provided with suitable vanes against which a stream of pressurised air can be blown to drive the flexible member 31 in the manner of a turbine.

The features of the various embodiments described may be used in any combination without departing from the invention.

We claim:

1. A propulsion system for propelling a vehicle over water, the system comprising a flexible member arranged in an endless loop, a plurality of cleat elements carried by the flexible element and substantially uniformly spaced therealong, each cleat element being adapted to thrust against the water, support means disposed within the loop and supporting the flexible member with a bight of the loop freely dependent from the support means, and drive transmitting means for interconnecting a driving means to the flexible member for driving the flexible member around the loop, each cleat element having at least one thrust surface which slopes outwardly from the loop in the direction of the leading edge of the element whereby, in operation, the thrust of the cleat element against the water will produce forces which urge the cleat element downwardly in the water.

2. A system according to claim 1 wherein the support means includes bearing means, and at least two spaced apart support rollers which are rotatably mounted on said bearing means, the flexible member being supported by the rollers in driving engagement with at least one of the rollers.

3. A system according to claim 2 wherein each cleat element has two thrust surfaces which diverge from each other in a direction away from the leading edge of the element.

4. A system according to claim 3 wherein the thrust surfaces of each cleat element are provided on parts which diverge from each other in the said direction, and including a cap portion which defines with said parts a space which tapers in the direction of the leading edge.

5. A propulsion system for propelling a vehicle over water, the system including support means comprising bearing means, at least two spaced-apart support rollers rotatably mounted on said bearing means, a flexible member arranged in an endless loop around said support rollers and supported thereby with a bight of the flexible member freely dependent below said rollers, means operable to maintain the flexible member in driving engagement with at least one of the support rollers, drive-transmitting means for interconnecting a driving means to the flexible member for driving the flexible member around the loop, and a plurality of cleat elements carried by the flexible member and spaced at substantially uniform intervals therealong, each cleat element having thrust surfaces which are adapted to thrust against the water to provide propulsive forces and forces which urge the cleat element downwardly in the water.

6. A system according to claim 5 including a pinch roller, means resiliently mounting said pinch roller to said bearing means, the flexible member being resiliently urged into driving engagement with said one support roller by said pinch roller, and said drive transmitting means serving to interconnect one of the pinch roller and the said one support roller to a driving means.

7. A system according to claim 5 wherein at least said one support roller is formed with a peripheral groove for receiving the flexible member, and means are provided for applying a vacuum to a region of said peripheral groove which is fixed relative to said bearing means for maintaining the flexible member in driving engagement with said one roller in said region of the groove, said drive transmitting means serving to interconnect said roller to a driving means.

8. A system according to claim 7 wherein said support roller encloses a space concentric with said peripheral groove and communicating therewith, connecting means associated with said bearing means which cooperate with said support roller to provide a connection between said space and a source of vacuum, and an obturating member disposed in said space and fixed in relation to said bearing means, said obturating member serving, in operation, to confine the vacuum substantially to said region of the peripheral groove.

9. A system according to claim 5 wherein the flexible member is provided with a succession of substantially uniformly spaced apertures, and at least one support roller includes a plurality of peripherally-disposed sprockets which are arranged to be received in the apertures in the flexible member for driving the flexible member, the drive transmitting means serving to interconnect the support roller to a driving means.

10. A system according to claim 9 including guard means fixed relative to the bearing means and which partly surrounds and is spaced from said support roller with the flexible member passing between the guard means and the support roller, whereby to maintain the flexible member in driving engagement with the support roller at high rotational speeds thereof.

11. A system according to claim 5 including means movably mounted on said bearing means within the loop, and having an upper inoperative position and a lower operative position in which it cooperates with, and downwardly urges, the flexible member whereby in its operative position, the flexible member may be employed for propulsion over land.

12. A system according to claim 5 including means movably mounted on said bearing means and having a lower inoperative position and an upper operative position, said means in the upper position cooperating with said flexible member to raise the flexible member relative to the bearing means.

13. A system according to claim 5 including land-engaging wheels, means retractibly mounting said wheels to said bearing means, at least one coupling element on each wheel, a coupling element on each support roller which is adapted to cooperate with the coupling member on a corresponding wheel whereby rotation of said support roller will cause rotation of the wheel, said drive transmitting means serving to interconnect said support roller to a driving means for driving said wheel.

14. A water operable vehicle including a propulsion system in accordance with claim 2, and a body comprising said bearing means.

15. A water operable vehicle including two propulsion systems in accordance with claim 2, wherein the freely dependent bights of the loops of the respective flexible members move in substantially vertical planes which converge towards one of the longitudinal ends of the vehicle.

References Cited

UNITED STATES PATENTS

| | | | |
|---|---|---|---|
| 3,019,884 | 2/1962 | Bartelt | 198—39 |
| 3,189,115 | 6/1965 | Rethorst | 114—67 |

FOREIGN PATENTS

| | | |
|---|---|---|
| 1,013,425 | 12/1965 | Great Britain. |
| 1,024,174 | 3/1966 | Great Britain. |
| 1,339,275 | 8/1963 | France. |

ANDREW H. FARRELL, *Primary Examiner.*